(12) United States Patent
Higaonna et al.

(10) Patent No.: US 8,785,048 B2
(45) Date of Patent: Jul. 22, 2014

(54) CARBONACEOUS MATERIAL FOR ELECTRIC DOUBLE LAYER CAPACITOR, ELECTRIC DOUBLE LAYER CAPACITOR AND PROCESS FOR PRODUCING CARBONACEOUS MATERIAL

(75) Inventors: Yasuyuki Higaonna, Kakegawa (JP);
Tetsuya Kume, Kakegawa (JP);
Yasunari Iwata, Kakegawa (JP);
Makoto Takeuchi, Kunitachi (JP)

(73) Assignees: Cataler Corporation, Shizuoka (JP);
Advanced Capacitor Technologies, Inc., Akishima-shi (JP)

( * ) Notice: Subject to any disclaimer, the term of this patent is extended or adjusted under 35 U.S.C. 154(b) by 20 days.

(21) Appl. No.: 11/921,872

(22) PCT Filed: Jun. 13, 2006

(86) PCT No.: PCT/JP2006/312211
§ 371 (c)(1),
(2), (4) Date: Dec. 10, 2007

(87) PCT Pub. No.: WO2006/135086
PCT Pub. Date: Dec. 21, 2006

(65) Prior Publication Data
US 2009/0104105 A1   Apr. 23, 2009

(30) Foreign Application Priority Data

Jun. 14, 2005  (JP) .................................. 2005-173534

(51) Int. Cl.
*H01M 4/13* (2010.01)
*H01M 4/58* (2010.01)
*B01J 19/08* (2006.01)
*C01B 31/00* (2006.01)

(52) U.S. Cl.
USPC ................ 429/231.8; 429/218.1; 361/502; 423/445 R; 423/445 B

(58) Field of Classification Search
None
See application file for complete search history.

(56) References Cited

U.S. PATENT DOCUMENTS 4,597,028 A * 6/1986 Yoshida et al. ............... 361/305
5,161,094 A * 11/1992 Bruder et al. ................. 361/502
5,172,307 A * 12/1992 Tabuchi et al. ............... 361/502

(Continued)

FOREIGN PATENT DOCUMENTS

| JP | A-2000-246102 | 9/2000 |
| JP | A 2002-249307 | 9/2002 |
| JP | A 2002-362912 | 12/2002 |
| JP | A 2004-031713 | 1/2004 |

OTHER PUBLICATIONS

J. Jones et al., "Electron Spin Resonance and the Structure of Carbon Fibers," 1982, *Carbon*, vol. 20, No. 5, pp. 379-385.

(Continued)

*Primary Examiner* — Guinever Gregorio
(74) *Attorney, Agent, or Firm* — Oliff PLC

(57) ABSTRACT

A carbonaceous material used as a polarizable active material in an electric double layer capacitor is characterized in that, when measured by an electron spin resonance method without adding any additives, the obtained peak line width is 2 mT or less, and the peak intensity, which is converted into a number of unpaired electrons per 1 g, is $1 \times 10^{19}$ or more. A method for producing the carbonaceous material includes removing residual functional groups from the carbonaceous material so that reactions between the residual functional groups and the electrolytic liquid are suppressed when forming a capacitor.

2 Claims, 2 Drawing Sheets

(56) References Cited

U.S. PATENT DOCUMENTS

| | | | |
|---|---|---|---|
| 5,891,822 A | 4/1999 | Oyama et al. | |
| 6,275,371 B1 * | 8/2001 | Yoshio et al. | 361/502 |
| 6,426,862 B1 * | 7/2002 | Vasechkin et al. | 361/502 |
| 6,433,996 B1 * | 8/2002 | Hata et al. | 361/502 |
| 6,592,838 B1 * | 7/2003 | Nomoto et al. | 423/445 R |
| 6,885,545 B2 * | 4/2005 | Michel et al. | 361/502 |
| 7,095,604 B2 * | 8/2006 | Noguchi et al. | 361/502 |
| 7,625,543 B2 * | 12/2009 | Shigematsu et al. | 423/445 R |
| 7,835,137 B2 * | 11/2010 | Kang et al. | 361/502 |
| 2003/0228250 A1 | 12/2003 | Takeuchi | |
| 2004/0085710 A1 * | 5/2004 | Takeuchi et al. | 361/502 |
| 2005/0146836 A1 * | 7/2005 | Minnear et al. | 361/303 |

OTHER PUBLICATIONS

Aug. 1, 2013 Office Action issued in Japanese Application No. 2007-521375 (with English Translation).

Nov. 24, 2010 Office Action issued in Korean Application No. 10-2007-7029203 (with translation).

Oct. 10, 2013 Extended European Search Report issued in Application No. 06766875.6.

* cited by examiner

CARBONACEOUS MATERIAL FOR ELECTRIC DOUBLE LAYER CAPACITOR, ELECTRIC DOUBLE LAYER CAPACITOR AND PROCESS FOR PRODUCING CARBONACEOUS MATERIAL

TECHNICAL FIELD

The present invention relates to a carbonaceous material, which is used for a polarizable active material in an electric double layer capacitor.

BACKGROUND ART

Recently, electric double layer capacitors whose internal resistances are reduced and whose capacities are enlarged have been developed. The electric double layer capacitors are such that it has been expected to apply them to power usage. The electric double layer capacitors are such that it is the principle that a pair of polarizable electrodes are disposed so as to face to each other in an electrolyte solution with a separator interposed therebetween to make a positive electrode and a negative electrode so that electric charges are accumulated in electric double layers, which are formed in the interfaces between the electrodes (polarizable electrodes) and the electrolyte solution.

The static capacity of electric double layer capacitor is believed to be in proportion to the area of polarizable electrode substantially. Hence, as an electrode material for polarizable electrode, activated carbon, which has a large specific surface area, has been used.

Activated carbon has been produced by means of activating treatment (activation treatment), and a large number of functional groups remain on the surface. When adapting such activated carbon to be the electrodes of electric double layer capacitor; using an organic solvent-based electrolyte solution; and applying a voltage between the facing electrodes, the residual functional groups, especially, the hetero element-containing functional groups, which are left on the surface of the carbon electrodes, have reacted with the electrolyte solution to generate gases, such as $CO_2$, CO and $H_2O$, or to form electrically non-conductive film, and thereby such drawbacks have arisen that the internal resistance of electric double layer capacitor enlarges to result in malfunction, or to shorten the longevity of electric double layer capacitor.

As a method for removing such residual functional groups, methods for heating them in an inert gas atmosphere or in a reducing gas atmosphere have been available. However, in these methods, the reactivity to the residual functional groups is so low that it has not been possible to remove the residual functional groups fully.

With respect to such a problem, performing a heat treatment to them together with a transition metal or its compound in a reducing atmosphere is disclosed in Japanese Unexamined Patent Publication (KOKAI) No. 2002-362,912. However, the method using a transition metal or its compound is such that there has been such a problem that it takes a lot of time to carry out the process for removing the transition metal or its compound from the mixture of the activated carbon and the transition metal or its compound so that it hinders the industrialization. Specifically, in this publication, when using a ferromagnetic transition metal, such as Fe, Ni and Co, it is used as a powder having a fine particle diameter, and the removal after the heat treatment is removed by means of magnetic force. When being a transition metal, such as Cu, that is not ferromagnetic, a process is specified in which it is turned into a fine-net shape or a cotton-like shape to use; when being a compound of the aforementioned transition metal, it is dissolved into a solvent, is permeated through a carbonaceous material, and is removed by eluting it out thereof using an acid or base after the heat treatment. Moreover, capacitors, which use the carbonaceous material produced by the method set forth in this publication, are such that there has been a problem in that the charge/discharge characteristics are not sufficient.

DISCLOSURE OF THE INVENTION

The present invention is one which has been done in view of the aforementioned circumstances, and it is an assignment to provide a carbonaceous material for electric double layer capacitor, carbonaceous material which demonstrates a good charge/discharge characteristic, when it makes an electric double layer capacitor.

The inventors of the present invention have been investigating into carbonaceous materials over and over again in order to solve the aforementioned assignment; as a result, they have arrived at completing the present invention.

A carbonaceous material according to the present invention for electric double layer capacitor is used as a polarizable active material in electric double layer capacitor, and is characterized in that, when measuring it by an electron spin resonance method without adding any additive thereto, the obtained peak line width is 2 mT or less.

A carbonaceous material according to the present invention for electric double layer capacitor is used as a polarizable active material in electric double layer capacitor, and is characterized in that a weight reduction rate is 2.0% or less according to a weight reduction method.

A carbonaceous material according to the present invention for electric double layer capacitor is used as a polarizable active material in electric double layer capacitor, and is characterized in that an m/s ratio is less than 0.15, the m/s ratio being a ratio of medium-relaxation components (m) whose spin traverse-relaxation time $T_2$=55-400 μsec to short-relaxation components (s) whose spin traverse-relaxation time $T_2$=10-50 μsec, the spin traverse-relaxation time $T_2$ being measured by a pulse NMR method.

An electric double layer capacitor according to the present invention is one which is characterized in that it uses the carbonaceous material set forth in either one of claims 1-3, and is characterized in that it uses the carbonaceous material whose peak line width, being obtained by means of an electron spin resonance method, is 2 mT or less.

An electric double layer capacitor according to the present invention is one which is characterized in that it uses the carbonaceous material set forth in either one of claims 1-3, and is characterized in that it uses the carbonaceous material whose weight reduction rate is 2.0% or less according to a weight reduction method.

An electric double layer capacitor according to the present invention is one which is characterized in that it uses the carbonaceous material set forth in either one of claims 1-3, and is characterized in that it is characterized in that it uses the carbonaceous material whose m/s ratio is less than 0.15, the m/s ratio being a ratio of medium-relaxation components (m) whose spin traverse-relaxation time $T_2$ 55-400 μsec to short-relaxation components (s) whose spin traverse-relaxation time $T_2$=10-50 μsec, the spin traverse-relaxation time $T_2$ being measured by a pulse NMR method.

A process according to the present invention for producing a carbonaceous material is a process for producing a carbonaceous material being a polarizable active material for electric double layer capacitor, process in which a treatment for removing residual functional groups is performed by heat treating them in a reducing atmosphere after carrying out an activating treatment, and is characterized in that the treatment for removing residual functional groups is such that the reducing atmosphere is a hydrogen atmosphere; and in that a noble-metal catalyst is used as a catalyst for generating atomic active hydrogen.

BEST MODE FOR CARRYING OUT THE INVENTION

Figure 1:
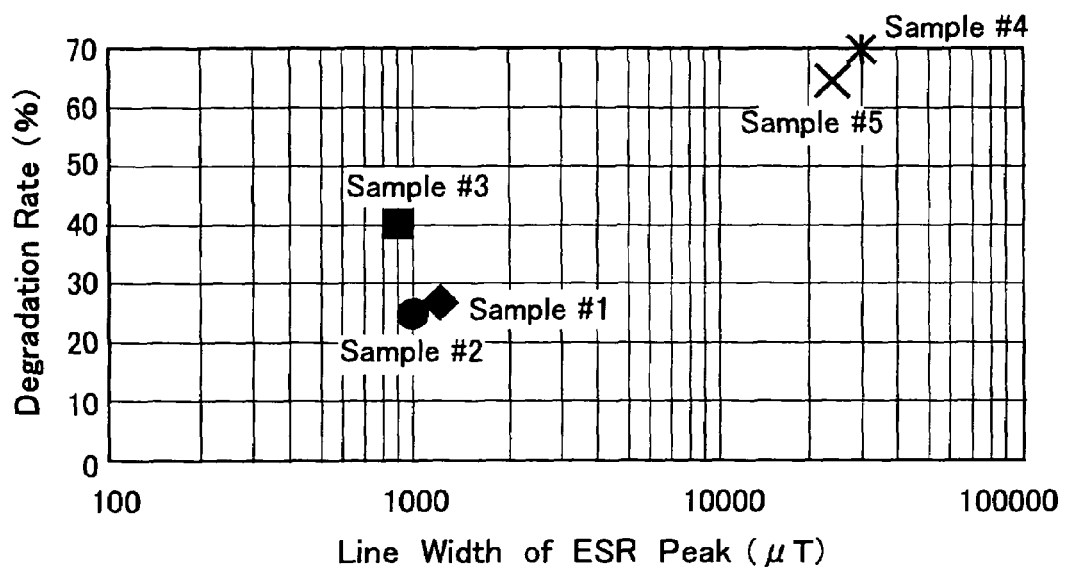
FIG. 1 is a diagram for illustrating the relationships between the ESR peak width of carbonaceous material and the degradation rate of capacitor.

Hereinafter, inventions which further embody said invention, and the embodiment modes of these inventions will be explained.

(Embodiment Modes of the Invention)
(Carbonaceous Material for Electric Double Layer Capacitor)

The carbonaceous material according to the present invention is a carbonaceous material that is used as a polarizable active material in electric double layer capacitor.

And, the carbonaceous material according to a first aspect for electric double layer capacitor is such that, when measuring it by an electron spin resonance method (ESR) without adding any additive thereto, the obtained peak line width is 2 mT or less.

The "additive" set forth herein refers to oxygen and water vapor in air, and, in addition thereto, electrically-conductive subsidiary agents, which have been used often in the case of producing carbonaceous material, and the present invention means that the ESR is observed in such a state that these are not included at all. Specifically, oxygen in air is likely to be adsorbed onto carbonaceous material, and oxygen, which is paramagnetic in itself, increases the ESR signal intensity, and enlarges the peak line width. Moreover, carbon black used as an electrically-conductive subsidiary agent is such that the ESR signal intensity is larger than that of carbonaceous material to be tested in general, and that the peak line width is narrower. Accordingly, when including these, it does not result in the evaluation of carbonaceous material to be tested per se at all. Consequently, the carbonaceous material is dried by heating in a vacuum, and is thereafter filled in a capillary test tube in an argon gas flow, and is further tailored to a test tube for ESR observation so that it is measured by means of the ESR.

The carbonaceous material, which is at issue in the present invention, is made up of multi-layered graphene fine crystals. The multi-layered graphene fine crystals are fine crystals similar to graphite (black lead), but the interlayer distance is widened more than that of graphite. As it has been known well, the electric conductivity is high within the graphite condensed six-member-ring planes, and that the direction perpendicular to the six-member-ring planes is semiconductor. Since residual functional groups occur at the ends of graphene fine crystals, the existence hinders fine crystals from bonding to each other, or hinders electronic conduction.

According to a detailed analysis on the ESR signal of graphite (Janice Breedon Jones et al., "Carbon," Vol. 20, No. 5, pp. 379-385, 1982), the measurement of ESR, or the direction of magnetic field correlates with the direction of crystal; when it is applied perpendicularly to the six-member ring, it excites an annular current of $\pi$ electrons so that an induced magnetic field, which in turn weakens the applied electric field, generates; and a resonance position shifts eventually. When a magnetic field is applied to the six-member ring parallelly, no such shift occurs. In polycrystalline samples, the directions of fine crystals differ variously; if the independent electron spins are isolated, they are observed as a broad signal in which signals exhibiting a variety shifting degrees are mixed. In actuality, however, the magnetically resonated electron spins fly around between fine crystals during the excited lifetime, are averaged by means of exchange interaction, and can be often observed as a one sharp resonance line. The presence of residual functional groups hinders "Mortional Spin Exchange Narrowing" between fine crystals. Active hydrogen oxide involving residual functional groups, especially involving hetero atom, when being used under an interpolar voltage of 2.5 V or more, causes electrode reactions, causes the decomposition or condensation of electrolyte or solvent, generates gases, and forms non-electrically-conductive films. Hydrogen, which is attached directly to an aromatic ring terminated with a hydrogen atom instead of these residual functional groups, shows a higher withstand voltage. And, in the present invention, the peak line width is 2 mT or less. Moreover, a more preferable peak line width can be 1.5 mT or less, and it can further preferably be 1.0 mT or less.

In addition, the signal intensity of ESR specifies a content of unpaired electrons in carbonaceous material; however, in this carbonaceous material, which is believed to be one of electrically-conductive polymers, it has not been explained yet in a strict sense. As described above, acetylene black, an electrically-conductive subsidiary agent, is such that the spin concentration is much greater; and, in boron-modified acetylene black, the line width is much narrower and the spin concentration is high as well. Contrary to ordinary Free Radical, the unpaired electrons, which are stabilized in the conjugate system of graphene, are those which contribute to the conductivity at least, and are those which are advantageous for enlarging the capacitance of carbon electrode and reducing the internal resistance.

The carbonaceous material according to a second aspect for electric double layer capacitor is such that a weight reduction rate is 2.0% or less in a weight reduction method. A weight reduction method is an evaluation method in which a carbonaceous material is heated to find a rate of weight reduction caused by the heating. That is, a weight change caused by heating occurs by means of the fact that reactions occur between residual functional groups on the surface of carbonaceous material and an atmosphere during the heating. As it is apparent from this, the smaller the weight reduction rate in a weight reduction method is, the less carbonaceous material's residual functional groups are and the higher carbonaceous material's crystallinity is. In the present invention, the lower the weight reduction rate is, the more it is preferable; 2.0% or less is preferable; it can more preferably be 1.0% or less, and can further preferably be 1.0% or less.

A weight reduction method is an evaluation method in which a dried carbonaceous material whose weight has been measured in advance is heated at 850° C. in a nitrogen-gas atmosphere for 1 hour, after cooling it to room temperature, and thereafter the weight of the carbonaceous material is measured, and then a reduction rate is found from the weights before and after the heating.

Specifically, a dried weight (W1) of a carbonaceous material to be evaluated is measured first. And, the carbonaceous material is heated under a predetermined condition. By means of this heating treatment, part of the carbonaceous material with low crystallinity is decomposed. And, after cooling it, a weight (W2) of the carbonaceous material is measured, and then a weight reduction rate is found from the weights before and after the heating treatment. The weight reduction rate can be found from an equation set forth below. That is, a weight reduction method is an evaluation method for evaluating the crystallinity or purity of carbonaceous material; for example, when a carbonaceous material has residual functional groups, the purity or crystallinity degrades so that the weight reduction rate increases. This implies that the smaller the weight reduction rate is, the less the residual function groups are in the carbonaceous material.

$$\text{Weight Reduction Rate (\%)} = \frac{W1 - W2}{W1} \times 100 \quad \text{(Math. 1)}$$

The carbonaceous material according to a third aspect is such that an m/s ratio is less than 0.15, the m/s ratio being a ratio of medium-relaxation time components (m) whose spin traverse-relaxation time $T_2$=55-400 μsec to short-relaxation time components (s) whose spin traverse-relaxation time $T_2$=10-50 μsec, $T_2$ being observed at $^1$H resonance by means of a pulse NMR method. Note that the medium-relaxation time components whose $T_2$=55-400 μsec are components which derive from the hydrogen of residual functional groups; and the short-relaxation time components (s) whose $T_2$=10-50 μsec are components which derive from the hydrogen attached directly to aromatic ring.

In a pulse NMR method, a peak of hydrogen (active hydrogen oxide), which remains in carbonaceous material, is obtainable. The content of active hydrogen oxide in carbonaceous material specifies the difference between the bonding states of residual hydrogen within the carbonaceous structure; and is specified by measuring short-relaxation time components whose spin traverse-relaxation time $T_2$=10-50 μsec (Gauss-type components) and medium-relaxation time components whose spin traverse-relaxation time $T_2$=55-400 μsec (or Lorentze-type components) that are observed at H resonance by means of a pulse NMR method, and by means of a content ratio of the respective components. And, the carbonaceous material according to the present invention is such that, when finding out short-relaxation time components whose $T_2$=10-50 μsec (Gauss-type components) and medium-relaxation time components whose $T_2$=55-400 μsec (Lorentze-type components) by means of $^1$H resonance resulting from the aforementioned pulse NMR method, a ratio of the medium-relaxation time components with respect to the short-relaxation time components (that is, the medium-relaxation time components/the short-relaxation time components) is less than 0.15. Specifically, it is one which exhibits such a characteristic that hydrogen, which derives residual functional groups, is less extremely. Specifically, such a carbonaceous material is a carbonaceous material in which residual functional groups is less extremely, and can be used as the polarizable electrodes of electric double layer capacitor, and electric double layer capacitors, which are made using these carbonaceous materials, turn into good ones in which the generation of gases during the charging and discharging, the attenuation of capacitance, and the rise of internal resistance do not arise. Moreover, the values of the aforementioned m/s, based on the measurement results being obtained by means of a pulse NMR method, can be found out by means of the calculation method being set forth in Japanese Unexamined Patent Publication (KOKAI) No. 2002-362,912. On that occasion, the measurement conditions of pulse NMR are not limited in particular, and a person having ordinary skill in the art can select them readily.

The carbonaceous material according to the present invention for electric double capacitor is such that, as far as being a carbonaceous material that have one of the above-described characteristics, its shape is not limited in particular. To put it differently, the carbonaceous material can be either those having pores, such as activated carbon and porous charcoal; or those free from pores, such as non-porous charcoal. Moreover, the carbonaceous material according to the present invention is such that, compared with carbonaceous materials to which no heat treatment is performed and carbonaceous materials to which heat treatments are performed with transition metals (the carbonaceous materials being set forth in Japanese Unexamined Patent Publication (KOKAI) No. 2002-362,912, for instance), one whose ESR signal intensity is higher is preferable, specifically those which exhibits a height of 5 times or more (further 10 times or more) are preferable.

The production process and raw material for the carbonaceous material are not limited in particular. For example, it can be either a carbonaceous material being produced from a plant material, such as wood and husk; a carbonaceous material being produced from a mineral material, such as coal; or a carbonaceous material being produced from a resin material, such as phenol resin, or it can be all of them.

Although the carbonaceous material according to the present invention is a carbonaceous material, which is set forth in either one of claims 1-3, it is allowable as well to adapt it to being constructions in which two or more of claims 1-3 are combined.

(Electric Double Layer Capacitor)

An electric double layer capacitor according to the present invention is an electric double layer capacitor in which the aforementioned carbonaceous materials for electric double layer capacitor are used as an electrode material. That is, the electric double layer capacitor according to the present invention uses the carbonaceous material, from which the aforementioned residual functional groups are removed, as an electrode material, and is turned into an electric double layer capacitor in which the occurrence of drawbacks resulting from the residual functional groups is suppressed.

The electric double layer capacitor according to the present invention is such that the materials other than the electrode material can be formed of conventionally known materials. For example, it can be produced by producing sheet-shaped electrodes and then by accommodating them in such a state that a separator is interposed therebetween in a casing together with an electrolytic solution.

For example, in order to manufacture sheet-shaped electrodes, it is carried out by means of adding and kneading carbon black, for instance, an electrically-conductive subsidiary agent for giving higher electric conductivity to carbonaceous material, and polytetrafluoroethylene (PTFE), for instance, as binder agent; and by means of press elongating them. As for the electrically-conductive subsidiary agent, in addition to carbon black (acetylene black, for instance), it is possible to use powdered graphite; moreover, as for the binder agent, in addition to PTFE, it is possible to employ PVDF, PE and PP. On this occasion, the compounding ratio of the carbonaceous material with respect to an electrically-conductive subsidiary agent (carbon black) and a binder agent (PTFE) can generally be 10:0.5-1.0:0.5-0.25 approximately.

To the thus obtained electrodes, a collector is attached, and, after forming a positive electrode and a negative electrode by means of overlapping them with a separator interposed therebetween, they are impregnated with an organic solvent including an electrolyte, and thereby they can be assembled into the electric double layer capacitor.

As for a solvent of the electrolyte employed in the electric double layer capacitor, it is possible to name carbonates, such as dimethyl carbonate, diethyl carbonate, ethylene carbonate and propylene carbonate; nitriles, such as acetnitrile and propionitrile; lactonnes, such as γ-butyrolactone, α-methyl-γ-butyrolactone, β-methyl-γ-butyrolactone, γ-valerolactone and 3-methyl-β-valerolactone; sulfoxides, such as dimethylsulfoxide and diethylsulfoxide; amides, such as dimethylformamide and diethylformamide; ethers, such as tetrahydrofuran and dimethoxyethane; dimethyl sulfolane, and sulfolane, for instance. These organic solvents is such that one member of them can be used or two or more members of them can be used as a mixture solvent.

As for an electrolyte to be dissolved in these organic solvents, it is possible to name ammonium tetrafluoroborates, like tetraethylammonium tetrafluoroborate, tetramethylammonium tetrafluoroborate, tetrapropylammonium tetrafluoroborate, tetrabutylammonium tetrafluoroborate, trimethylethylammonium tetrafluoroborate, triethylmethylammonium tetrafluoroborate, diethyldimethylammonium tetrafluoroborate, N-ethyl-N-methylpyrrolidinium tetrafluoroborate, N,N-tetramethylenepyrrolidinium tetrafluoroborate and 1-ethyl-3-methyl-imidazolium tetrafluoroborate; ammonium perchlorates, like tetraethylammonium perchlorate, tetramethylammonium perchlorate, tetrapropylammonium perchlorate, tetrabutylammonium perchlorate, trimethylethylammonium perchlorate, triethylmethylammonium perchlorate, diethyldimethylammonium perchlorate, N-ethyl-N-methylpyrrolidinium perchlorate, N,N-tetramethylenepyrrolidinium perchlorate and 1-ethyl-3-methyl-imidazolium perchloate; and ammonium hexafulorophosphates, like tetraethylammonium hexafluorphosphate, tetramethylammonium hexafluorphosphate, tetrapropylammonium hexafluorphosphate, tetrabutylammonium hexafluorphosphate, trimethylethylammonium hexafluorphosphate, triethylmethylammonium hexafluorphosphate and diethyldimethylammonium hexafluorphosphate.

It is preferable that a concentration of the electrolyte can be 0.5-5 mol/L. It is especially preferable to be 1.0-2.5 mol/L. When the electrolyte concentration is lower than 0.5 mol/L, it comes short of an electrolyte, and thereby the capacitance has degraded.

(Production Process for Carbonaceous Material)

A process according to the present invention for producing a carbonaceous material is a process that can produce the aforementioned carbonaceous materials. Specifically, the process according to the present invention for producing a carbonaceous material is for producing a carbonaceous being a polarizable active material for electric double layer capacitor, process in which a treatment for removing residual functional groups is performed by heat treating them in a reducing atmosphere after carrying out an activating treatment, and is characterized in that the treatment for removing residual functional groups is such that the reducing atmosphere is a hydrogen atmosphere; and in that a noble-metal catalyst is used as a catalyst for generating atomic active hydrogen.

The process according to the present invention for producing a carbonaceous material, which is a polarizable active material for electric double layer capacitor, is a production process which, after carrying out an activating treatment, performs a treatment for removing residual functional to it by heat treating it in a reducing atmosphere. That is, the process according to the present invention for producing a carbonaceous material, after performing an activating treatment to it, performs a treatment for removing residual functional groups to it. By performing these treatments to it, it is possible to produce the carbonaceous material which is useful as a polarizable active material for electric double layer capacitors.

The activating treatment is a treatment for controlling the pores and crystalline diameters of the heat-treated carbonaceous raw material. By performing this treatment, it is possible to turn the carbonaceous material, which is to be produced, into particulate shapes which are provided with pore diameters suitable for utilizing it as a polarizable active material for electric double layer capacitors. Here, the activating treatment specifies activation treatments, which have been carried out upon producing activated carbon.

And, the process according to the present invention for producing a carbonaceous material is such that, after the activating treatment is performed, residual functional groups are removed by carrying out a heat treatment in a reducing atmosphere. By heat treating the heat-treated carbonaceous raw material in a reducing atmosphere, functional groups (—COOH, —CHO, —OH, and the like, for instance) are reduced. As a result, a carbonaceous material, which is produced by means of the production process according to the present invention, becomes a carbonaceous material from which the residual functional groups are removed.

The treatment for removing residual functional groups is such that the reducing atmosphere is a hydrogen atmosphere; and a noble-metal catalyst is used as a catalyst for generating atomic active hydrogen. That is, the treatment for removing residual functional groups is a treatment in which the noble-metal catalyst activates hydrogen, which is contained in the reducing atmosphere, to generate atomic active hydrogen, and this atomic active hydrogen reduces residual functional groups. The noble-metal catalyst is provided with good reactivity at a temperature or more at which it shows catalytic activity, and accordingly can remove residual functional groups, which conventional catalyst composed of transition metals cannot remove. As for the noble-metal catalyst, it is possible to name at least one member selected from the group consisting of Rh, Ru, Pt and Pd. More preferably, it can be Pt or Rh.

The hydrogen atmosphere of the reducing atmosphere in the treatment for removing residual functional groups is such that not only it includes the atmosphere composed of hydrogen gas only but also mixture-gas atmospheres in which hydrogen gas is diluted with inert gases. The reducing atmosphere upon the heat treatment is formed of gas, which is introduced into a furnace for carrying out the heat treatment, and gas, which is exhausted from within the furnace.

By the fact that the heating temperature becomes 500-900° C., the noble-metal catalyst comes to show catalytic activity. When the heating temperature is less than 500° C., the effects of the noble-metal catalyst are not demonstrated so that functional groups come to remain in the produced carbonaceous materials. When it exceeds 900° C., the granular growth of the noble-metal catalyst arises so that the effects of the noble-metal catalyst decrease. A more preferable heating temperature can be 600-800° C., and can further preferably be 700° C.

Moreover, by the fact that the heating time becomes 0.5-10 hours, it is possible to remove the carbonaceous-material raw material's residual functional groups. When the heat treatment is less than 0.5 hours, the heating time is too short to fully remove residual functional groups. When it goes beyond 10 hours, the heating time is so long that the cost has increased. A more preferable heating time can be 3-5 hours, and can further preferably be 4 hours.

As aforementioned, although the noble-metal catalyst is one which is used to generate atomic active hydrogen for removing the residual functional groups of the heat-treated carbonaceous raw material, the noble-metal catalyst can also reduce residual functional groups on the surface of the heat-treated carbonaceous raw material directly. In other words, it is preferable that the noble-metal catalyst can be disposed adjacently to (in such a state that it contacts with) the heat-treated carbonaceous raw material. The method of disposing the noble-metal catalyst adjacently to the heat-treated carbonaceous raw material is not one which is limited especially.

In general, the noble-metal catalyst is such that its surface demonstrates the catalytic actions. That is, the wider superficial area the noble-metal catalyst has, the more advantageous it is. Moreover, the noble-metal catalyst is such that the larger particle diameter, the more the amount of the noble metal, which does not form (does not contribute to the catalytic reactions), increases and thereby the loss becomes larger. And, since the noble metal making the noble-metal catalyst is expensive, the smaller the particle diameter of the noble-metal catalyst is the better it is. That is, it is preferable that the noble-metal catalyst can be loaded on a support having heat resistance. By the fact that the noble-metal catalyst is disposed in such a state that it is loaded on a support, the separation between the carbonaceous material and the noble-metal catalyst (support being loaded therewith) becomes easy after the heat treatment. Regarding the material for the support to be loaded with the noble-metal catalyst, as far as it is a material having heat resistance, it is not one which is limited in particular; for example, it is possible to name stainless steel, and ceramic composed of alumina and the like. Preferably, it can be ceramic whose major component is alumina.

Moreover, the shape of the support is not one which is limited in particular. That is, either of the following is allowable: the support with the noble-metal catalyst loaded, per se, can form a structure which holds the heat-treated carbonaceous raw material during the heat treatment; or it can form a particulate shape which can be disposed to be mixed with the heat-treated carbonaceous raw material during the heat treatment. When the support is formed as a particulate shape, it is preferable that the particle diameter of the support particles can differ from that of the heat-treated carbonaceous raw material. By making the particle diameters of the support and heat-treated carbonaceous raw material different, it is possible to easily separate the support and the carbonaceous material by means of sieving, for instance. When the support itself forms a structure which can hold the heat-treated carbonaceous raw material during the heat treatment, it is preferable that the noble-metal catalyst can be loaded on the surface of the structure, that is, it is preferable that it can be loaded on the surface (the inner surface of a box-shaped container, for instance) with which the heat-treated carbonaceous raw material contacts directly. When the support itself forms a structure which can hold the heat-treated carbonaceous raw material during the heat treatment, it is possible to fractionate the carbonaceous material readily.

In addition, the method of loading the noble-metal catalyst on the support is not one which is limited in particular, either. For example, it can be loaded thereon by immersing the support, which is formed as a predetermined shape in advance, into a solution of the noble-metal catalyst; and by drying and calcining it.

Specifically, the production process according to the present invention can preferably be such that: the noble-metal catalyst is loaded on a heat-resistant support; and that the heat-resistant support is a shape which is larger than a particulate size of the heat-treated carbonaceous raw material, and, after it is heat treated in existence in proximity to the heat-treated carbonaceous raw material, it is made into a form, or is made of a material, or is made with a mechanism, form, material or mechanism which is separable by means of screening or fluidic fractionating process.

The production process according to the present invention is a production process in which the activating treatment and the heat treatment in a reducing atmosphere are performed, and can be adapted as well to be a process of performing the heat treatment in a reducing atmosphere to porous carbon, such as activated carbon being completed by performing an activation treatment, one of the activating treatments, or non-porous carbon. In this instance, the production process or raw material of porous carbon or non-porous carbon is not one which is limited in particular, either. Even when it is either a plant material, such as wood and husk; a mineral material, such as coal, cokes and insolubilized pitch; or a resin material, such as phenol resin, it cannot be one which is limited in particular.

A carbonaceous material, which is produced by means of the production process according to the present invention, is such that residual functional groups are removed. That is, the production process according to the present invention can produce the above-described carbonaceous material for electric double layer capacitor.

EXAMPLE

Hereinafter, the present invention will be described using a specific example.

As the specific example according to the present invention, carbonaceous materials for electric double layer capacitor were produced by a production process described below.

(Production Process for Heat-treated Carbonaceous Raw Material)

First of all, a raw material for carboniferous-system coke was calcined at 600-900° C. (750° C. in the present example) for 0.5-4 hours (1 hour in the present example), thereby performing a carbonization treatment. The interlayer distance $d_{002}$, which was found by means of x-ray diffraction, of the calcined product of the charcoal material, to which this carbonization treatment was performed, became 0.34-0.35 nm.

And, to this charcoal material, activation was carried out with an alkaline chemical (KOH in the present example). The activation was such that an alkaline chemical was added in an amount of 0.5-5-time equivalent weights (2.1-time equivalent weights in the present example) with respect to the charcoal material, and was carried out under the conditions of 700-900° C. (800° C. in the present example) in an inert gas atmosphere for 1-10 hours (4 hours in the present example). The after-activation charcoal material was such that the BET specific surface area was 300 m$^2$/g, and that the $d_{002}$ became 0.355-0.400 nm.

Afterward, the charcoal material, to which the activation treatment was performed, was washed with water until the alkaline chemical in the charcoal material became 10,000 ppm or less. Thereafter, it was granulated by means of pulverizing or sieving, and thereby a heat-treated carbonaceous raw material whose average particle diameters was 2-50 μm was produced.

(Sample No. 1)

First of all, spherical alumina with particle diameters of 1-10 mm was formed of activated alumina. And, these alumina particles were immersed in a Pt aqueous solution, were dried, and were calcined. Thus, Pt was loaded on the alumina particles. Pt was loaded in an amount of 0.1-5 g per 1-L apparent volume of the alumina particles.

And, these alumina particles with Pt loaded were mixed with the heat-treated carbonaceous raw material, were charged into a furnace, and were subjected to a heat treatment in a hydrogen gas atmosphere. The alumina particles and the heat-treated carbonaceous raw material were mixed so that the ratio of the weight of the heat-treated carbonaceous raw material to the weight of the alumina particles became 1:0.5-5 (1:1 in the present example). This heat treatment was such that a heat treatment was performed at 500-900° C. (700° C. in the present example) for 0.5-10 hours (4 hours in the present example) in such a state that the atmosphere within the furnace was turned into a 100%-hydrogen-gas atmosphere by keeping a hydrogen gas flowing into the furnace.

Cooling was carried out after the heat treatment, the alumina particles were sieved out, and thereby a carbonaceous material according to Sample No. 1 for electric double layer capacitor was obtained.

(Sample No. 2)

First of all, spherical alumina with particle diameters of 1-10 mm was formed of activated alumina. And, these alumina particles were immersed in an Rh aqueous solution, were dried, and were calcined. Thus, Rh was loaded on the alumina particles. Rh was loaded in an amount of 0.1-5 g per 1-L apparent volume of the alumina particles.

Thereafter, using the alumina particles with Rh loaded, a heat treatment was performed to the heat-treated carbonaceous raw material in the same manner upon Sample No. 1. And, cooling and sieving were carried out after the heat treatment, and thereby a carbonaceous material according to Sample No. 2 for electric double layer capacitor was obtained.

(Sample No. 3)

A substantially-box-shaped container, in which honeycomb-shaped cells were demarcated and whose top opens and whose bottom turns into the bottom surface, was formed by molding stainless exhibiting heat resistant. And, Ni plating was carried out onto the cells' inner peripheral surface to form an Ni coat on the surface.

Afterward, the heat-treated carbonaceous raw material was accommodated in these cells. And, a heat treatment was performed to the heat-treated carbonaceous raw material in the same manner upon Sample No. 1. And, cooling was carried out after the heat treatment, and it was taken out of the container, and thereby a carbonaceous material according to Sample No. 3 for electric double layer capacitor was obtained.

(Sample No. 4)

Sample No. 4 was a heat-treated carbonaceous raw material to which no heat treatment was carried out.

(Sample No. 5)

The heat-treated carbonaceous raw material was charged into a furnace, and a heat treatment was performed in a hydrogen gas atmosphere. This heat treatment was such that a heat treatment was performed at 500-900° C. (700° C. in the present example) for 0.5-10 hours (8 hours in the present example) in such a state that the atmosphere within the furnace was turned into a 100%-hydrogen-gas atmosphere by keeping a hydrogen gas flowing into the furnace.

Cooling was carried out after the heat treatment, and thereby a carbonaceous material according to Sample No. 5 for electric double layer capacitor was obtained.

Note that, in the production of the carbonaceous material according to aforementioned Sample Nos. 1-2 and 5, the method of charging the heat-treated carbonaceous raw material was such that a method was taken, method in which it is disposed within the furnace using the same container as used in Sample No. 3 except that it had no Ni plating.

(Evaluation)

The ESR, pulse NMR and weight reduction rate of the produced carbonaceous material according to Sample Nos. 1-5 were measured. The measurement results are set forth in Table 1.

Test specimens used in the measurement of ESR and pulse NMR were carried out based on an identical process. Specifically, a plurality of thick-walled containers, which were made of aluminum whose thermal conduction was high, were prepared; carbonaceous test specimens to be tested (carbonaceous materials according to Sample Nos. 1-5) were put into these containers in an amount of 2 g (for ESR: 0.5 g, and for pulse NMR: 1.5 g); they were plugged with glass fiber or carbon fiber lest the carbonaceous materials were bubbled over to the outside of the containers by means of gas bumping; and vacuum drying was performed in a vacuum baking-out furnace, which neighbored a glove box. They were processed at 220° C., and were left to cool in an argon gas after the degree of vacuum reached the order of $10^{-5}$ Pa (about 16 hours); and the preparation of test specimens for ESR and for NMR was carried out in such an atmosphere that the water content in the argon gas was 0.1 ppm approximately.

(Test Specimen for ESR)

The test specimens for ESR were such that sampling was carried out within the argon-gas-atmosphere glove box so as to avoid the broadening of peak line width which resulted from the oxygen doping of carbonaceous material. Specifically, the leading opposite end of a disposable pipette, whose inside diameter was 0.7 mm approximately and which was made of glass, was welded to use. The test specimens were filled into it through the opened ends with a thick pipe diameter; they were filled up in the capillary portions with a vibration compactly free of any void; a ferral, which was for liquid chromatography with 1.57-mm (1/16-inch) pipe diameter and was made of resin, was fitted into them until it stuck at the tapered surface; and its end was cut. Another ferral was fitted into a standard test tube for X-Band at the quarts-glass portion so that this was placed at the center of a cavity resonator. The end-capped ESR test samples were put all together in an aluminum-laminated bag, and were sealed therein so as to open them immediately before the measurement.

(Measurement of ESR)

The ESR used an apparatus (produced by JEOL Ltd.) for X-Band (9.5 GHz) research. Usually, when using a standard quartz test tube with 5-mm outside diameter, it is common to take a method of isolating carbonaceous particles with Alundum or magnesium oxide powder in order to get rid of macro electric conductivity (Matrix Isolation). However, since the measurement was herein carried out in such a state that nothing was added to the carbonaceous materials, the above-described method was employed. Depending on the electric conductivity of the respective carbonaceous samples or the fluctuation in the pipe diameter of the disposable pipettes, although the reduction of the cavity resonator's Q was appreciated, it was possible to carry out the measurement by making a fine adjustment to the intrusion length into the resonator.

The differential wave forms of resonance absorption line were observed by a 100-kHz magnetic-field modulation method. In principle, the modulation width was measured at 0.04 mT by magnetic-field sweeping while dividing the Free Electron areas in twice, the 80-mT wider range and the 20-mT narrower range. The peak line width of signal line was expressed by the peak interval (μT, the units) of original primary differential curves; the signal intensity was expressed by the product of the peak line width and the peak-to-peak; if necessary, the twice-integrated value of differential curves was calibrated with a standard test sample with a known spin concentration, and was converted into a spin concentration per unit weight.

(Test Specimen for Pulse NMR)

The test specimens were filled in the 10-mm glass NMR test tubes, which were heated to dry along with the carbonaceous samples to be tested; the inner caps made from PTFE were fitted into them with glass-fiber cloth interposed therebetween; the exclusive caps were applied to them; they were put in an aluminum-laminated bag; and they were sealed within the glove box. They were kept in this state so that they were opened immediately before the measurement, thereby avoiding the intrusion of water from the outside as much as possible.

(Measurement of Pulse NMR)

The pulse NMR used "U-25" (produced by JEOL DATUM Ltd.), an apparatus exclusively for pulse NMR. Since the proton resonance frequency is 25 MHz, the drop of the detector's Q was as small as negligible, even when being electrically-conductive carbon having such a particle diameter as 50 μm or less approximately as used herein, so that the test specimens could be measured as they were.

The measurement of pulse NMR was conducted by means of a solid-state echo method at 2-μsec pulse width, at repetition intervals of 1 second, and in 512-time repetition accumulated number; the obtained attenuation signals were analyzed as such a binary system as a Gauss-type curve approximation for the short-relaxation time components and a Lorentz-type curve approximation for the medium/long-relaxation time components. And, the short-relaxation time components (s) whose spin traverse-relaxation time $T_2$=10-50 μsec (Gauss type) and the medium-relaxation time components (m) whose spin traverse-relaxation time $T_2$=55-400 μsec (Lorentze type), short-relaxation time components (s) and medium-relaxation time components (m) which were observed at $^1H$ resonance by means of the pulse NMR method, were measured, and thereby the pulse NMR ratio (m/s) was determined.

(Weight Reduction Rate)

First of all, the carbonaceous materials were subjected to such a heating treatment in an air atmosphere at 200° C. for 1 hour. After heating them, they were cooled in a dry atmosphere, and were weighed out by 1 g (W1) in a crucible. The crucibles were placed in a muffle furnace in such a state that they were accommodated in a container for calcination, and were subjected to a heating treatment. The heating treatment was such that, in such a state that a nitrogen gas was introduced into the muffle furnace at a flow rate of 5 L/min., the temperature was increased to 850° C. at a temperature increment rate of 5° C./min. And, they were held at 850° C. in the nitrogen gas atmosphere for 1 hour. After the holding, they were cooled down to room temperature in such a state that the nitrogen gas atmosphere was retained, and the weights (W2) of the carbonaceous materials were measured immediately after the cooling. From the weights W1 and W2 of the carbonaceous materials before and after the heating treatment, their weight reduction rates, which were obtained according to aforementioned Math. 1, were found.

TABLE 1

| | ESR | | Weight Reduction Rate (%) | Pulse NMR Ratio (m/s ratio) | Capacitance (F/mL) | Internal Resistance (Ω) | Degradation Rate (%) |
|---|---|---|---|---|---|---|---|
| | Peak Width (μT) | Peak Height (arditrary) | | | | | |
| Sample No. 1 | 1160 | 2030 | 1.6 | 0.12 | 35.1 | 4.8 | 27 |
| Sample No. 2 | 964 | 2391 | 1.3 | 0.11 | 36.2 | 5.2 | 25 |
| Sample No. 3 | 889 | 3588 | 2.0 | 0.19 | 37.8 | 5.8 | 40 |
| Sample No. 4 | 30108 | 322 | 6.6 | 0.6 | 33.1 | 5.8 | 68 |
| Sample No. 5 | 23812 | 690 | 3.1 | 0.3 | 34.2 | 4.1 | 50 |

Moreover, electric double layer capacitors were produced using the carbonaceous materials according to Sample Nos. 1-5, the charge/discharge characteristics were measured.

(Electric Double Layer Capacitor)

First of all, as active materials, carbonaceous test specimens, which were made by heating and vacuum drying (200° C., 0.1 Torr, and 2-4 hours) obtained Sample Nos. 1-5, as an electrically-conductive subsidiary agent, carbon black ("DENKA BLACK" produced by DENKI KAGAKU KOGYO Co., Ltd.), a PTFE binder ("6J" produced by MITSUI-DUPONT FLUOROCHEMICAL Co., Ltd.) were weighed out in such a proportion as 10:0.5:0.25 by weight ratio; they were mixed carefully in a mortar; they were kneaded; they were finished to sheets with thickness t=100 μm by rolling with hot rollers; and they were molded to a φ20-mm disk shape with a puncher.

An aluminum dish on which these carbon electrodes were placed was put in an aluminum vat; they were processed together with such a separator as "GA-100" (glass-fiber separator produced by ADVANTECH TOYO Co., Ltd., and 0.44-mm thickness) in a vacuum-heating furnace at 250° C. in 5×10$^{-5}$ Torr for 2-4 hours; they were set in a glove box; after adding a Japanese-paper separator to a vacuum-impregnation bath to carry out mounting and then vacuumizing the inside, the cock of solution inlet opening was opened to take in an electrolyte solution (a PC (propylene carbonate) solution ("SOL LITE" produced by MITSUBISHI KAGAKU Co., Ltd.) of 1.0-mol/L-concentration $Et_4NBF_4$ (tetraethylammonium tetrafuluoroborate)), which was dried fully by placing it in coexistence with activated alumina. The state of the electrodes were observed through the observation port, the vacummizing was kept as long as bubbles generated from inside the electrodes and separators; after impregnating them with the electrolyte solution fully, they were taken out from the bath; and the electrodes with the separators interposed were held between aluminum collector-electrode foils, which had been prepared in advance and which had been subjected to a surface roughening treatment, to assemble three-electrode cells; and they were put into an aluminum-laminated bag while being pinched with a jig; and they were vacuum-packed, thereby manufacturing capacitors for evaluation, capacitors which used the carbonaceous materials according to Sample Nos. 1-5.

Note that, although a plastic bag used for the vacuum packing was such that a transparent laminated plastic bag was used so as to make the inside state observable, it has been known that, regarding the performance of charging/discharging test, especially the result of long-term test, it is affected as well by the type of packing materials used in the vacuum packing; accordingly, when evaluating the long-term performance, it is preferable to employ a laminated plastic bag with a built-in aluminum foil through which no water permeates; moreover, by means of this, the performance of long-term longevity test improves remarkably.

(Charge/Discharge Characteristic)

Figure 2:
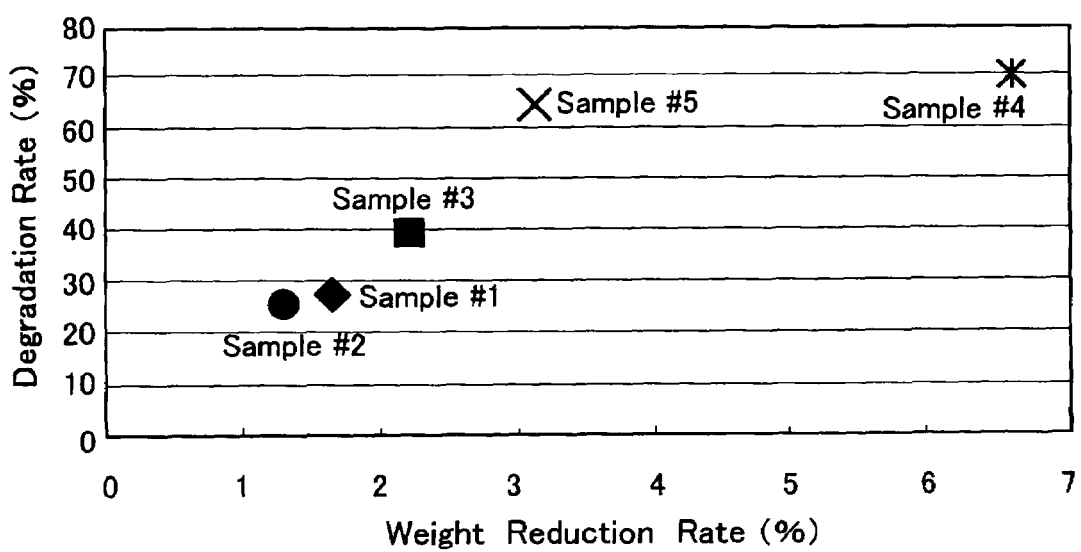
FIG. 2 is a diagram for illustrating the relationships between the weight reduction rate of carbonaceous material and the degradation rate of capacitor.
Figure 3:
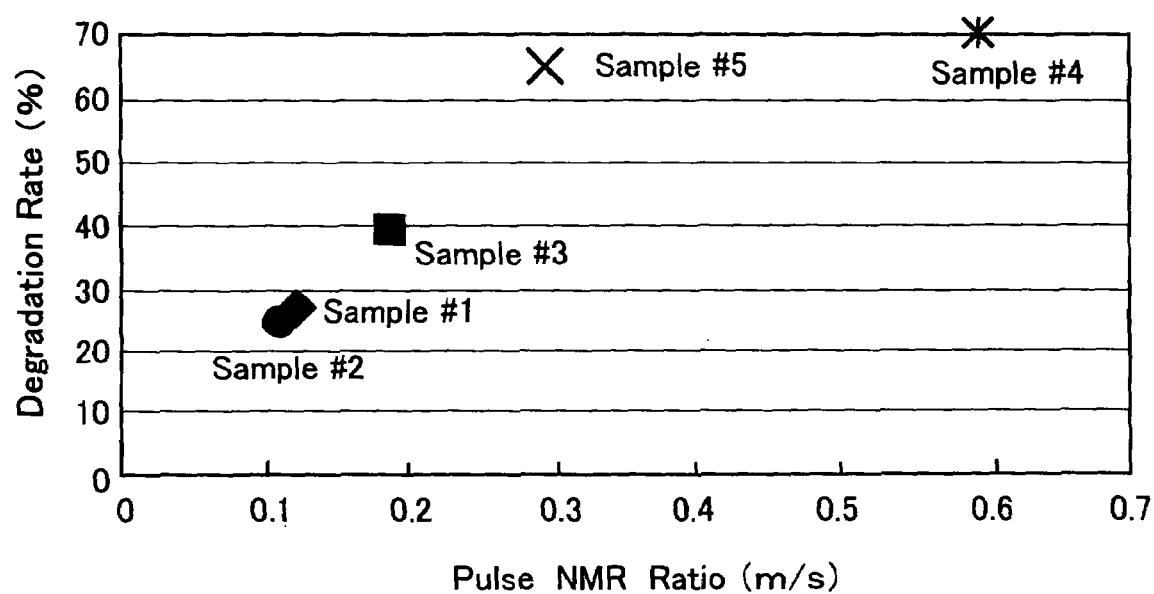
FIG. 3 is a diagram for illustrating the relationships between the NMR ratio of carbonaceous material and the degradation rate of capacitor.

And, the charge/discharge characteristics of the capacitors for evaluation were evaluated by means of charging them at a constant current and monitoring the voltages, which increased as electric charges accumulated in the capacitors. Specifically, they were charged at a constant current of 10 mA (or 5 mA); when the voltages between both electrodes, the positive electrode and negative electrode, reached a predetermined voltage, for instance, 3.75 V, they were put in a constant-voltage charging mode by retaining the voltage, and thereby the electric current started attenuating. When a predetermined charging time T (usually, 450 seconds) elapsed, the polarity was switched to discharge them in a constant-current discharging mode at a constant current of 10 mA (or 5 mA), it was kept going on until the voltages became 0 V. After this, by way of an intermission time (usually, 180 seconds), the constant-current charging/discharging was repeated again for 1-3 times in the same manner as described above; thereafter the applied voltage was decreased to 3.3 V; and the discharging completion voltage was adapted to be 0.5 V, thereby conducting a cyclic test at the same current. The measurement was conducted using an exclusive charge/discharge testing device ("CDT-5RZ-4" produced by POWER SYSTEM Co., Ltd.) which could process four channels simultaneously. Note that the degradation rate was such that the initial capacitance upon the initiation of conducting the cyclic test was found from the ratio of capacitance after testing 1,000 cycles. The obtained results (capacitance, internal resistance and degradation rate) are set forth in Table 1 all together. Moreover, the relationships between the ESR peak line width and the degradation rate are shown in FIG. 1; the relationships between the weight reduction rate and the degradation rate are shown in FIG. 2; and the relationships between the NMR ratio and the degradation rate are shown in FIG. 3.

From Table 1, it is understood that the charge/discharge characteristics of the capacitors, which were produced from the carbonaceous materials according to Sample Nos. 1-3 from which residual functional groups were removed, were upgraded. That is, by using a carbonaceous material from which residual functional groups were removed, the residual functional groups of carbonaceous material were inhibited from reacting with an electrolytic solution, and thereby the generation of gases and the rise of internal resistance, generation and rise which resulted from the reactions between residual functional groups and electrolyte solution, were suppressed.

Moreover, the carbonaceous materials according to Sample Nos. 1 and 2 were such that residual functional groups were removed much more. In other words, it was confirmed that it is possible to remove much more residual functional groups by carrying out a heat treatment along with a noble-metal catalyst in a reducing atmosphere.

In addition, the carbonaceous materials according to Sample Nos. 1-3 were produced by performing the heat treatment in such a state the catalysts (Rh, Pt and Ni) were loaded on the supports. The supports and the carbonaceous materials could be separated with ease. To put it differently, the separation between the catalysts and the carbonaceous materials was not troublesome at all upon producing the carbonaceous materials.

The invention claimed is:

1. A process for producing a carbonaceous material as a polarizable active material for an electric double layer capacitor, the process comprising the steps of:
   providing a carbonaceous raw material;
   performing an activating treatment on the carbonaceous raw material to result in a heat-treated carbonaceous raw material; and
   conducting a treatment for removing residual functional groups remaining on the heat-treated carbonaceous raw material after the activating treatment, the treatment for removing residual functional groups comprising:
   applying a heat resistant support to a surface of the heat-treated carbonaceous raw material, the heat resistant support having a particulate shape;
   loading a noble-metal catalyst on a surface of the heat-resistant support; and
   providing a reducing atmosphere being a hydrogen atmosphere; and
   heat treating the noble-metal catalyst loaded on the surface of the heat resistant support in the reducing atmosphere under a mixed condition of the noble-metal catalyst and the heat-treated carbonaceous raw material having the heat resistant support, the noble-metal catalyst generating atomic active hydrogen.

2. The process for producing a carbonaceous material set forth in claim 1, wherein:
   the noble-metal catalyst is loaded on a heat-resistant support; and
   the heat-resistant support is a shape which is larger than a particulate size of the heat-treated carbonaceous raw material, and, after it is heat treated in existence in proximity to the carbonaceous material, it is made into a form, or is made of a material, or is made with a mechanism, form, material or mechanism which is separable by means of screening or fluidic fractionating process.

* * * * *